United States Patent Office 3,161,558
Patented Dec. 15, 1964

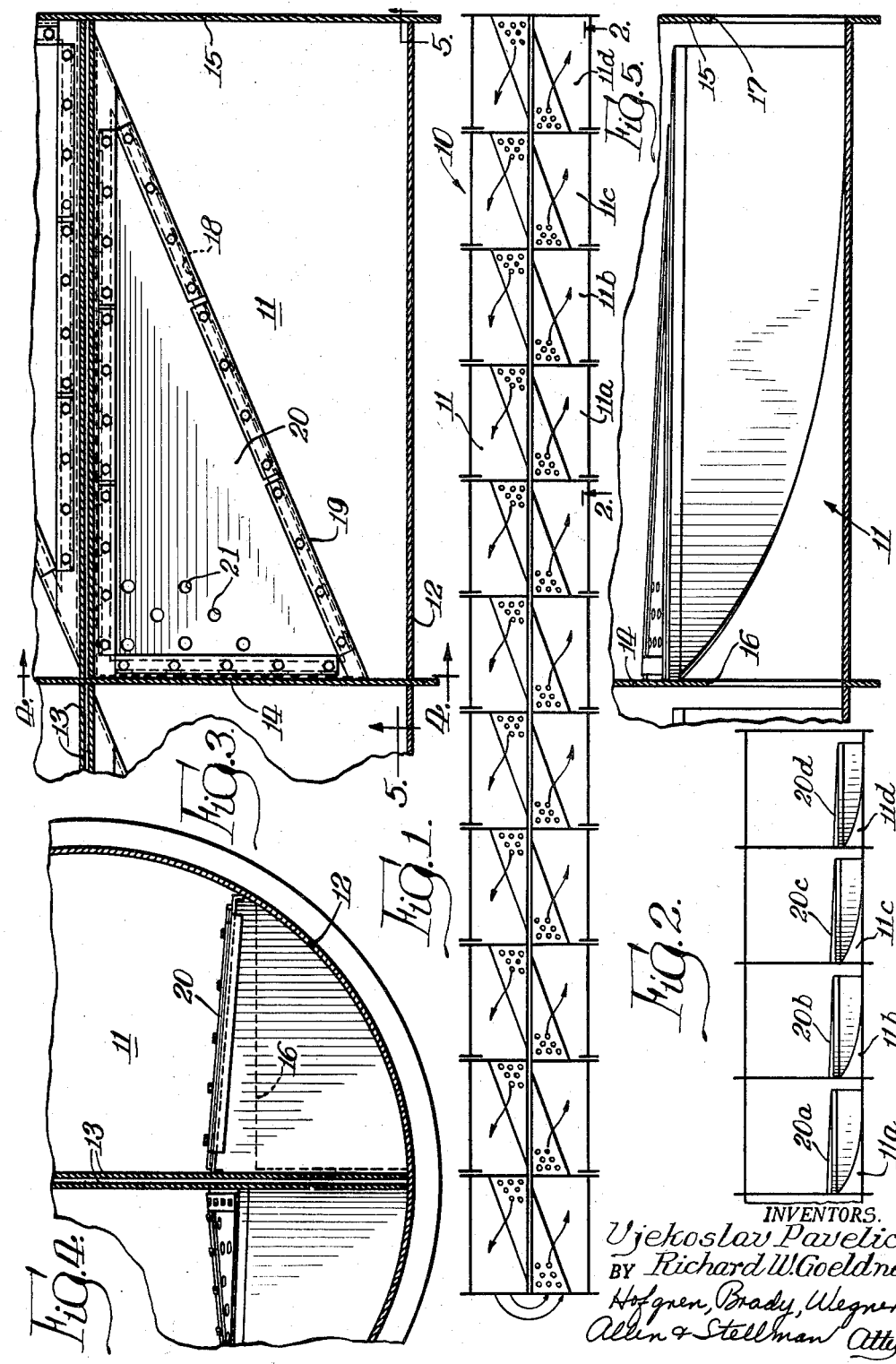

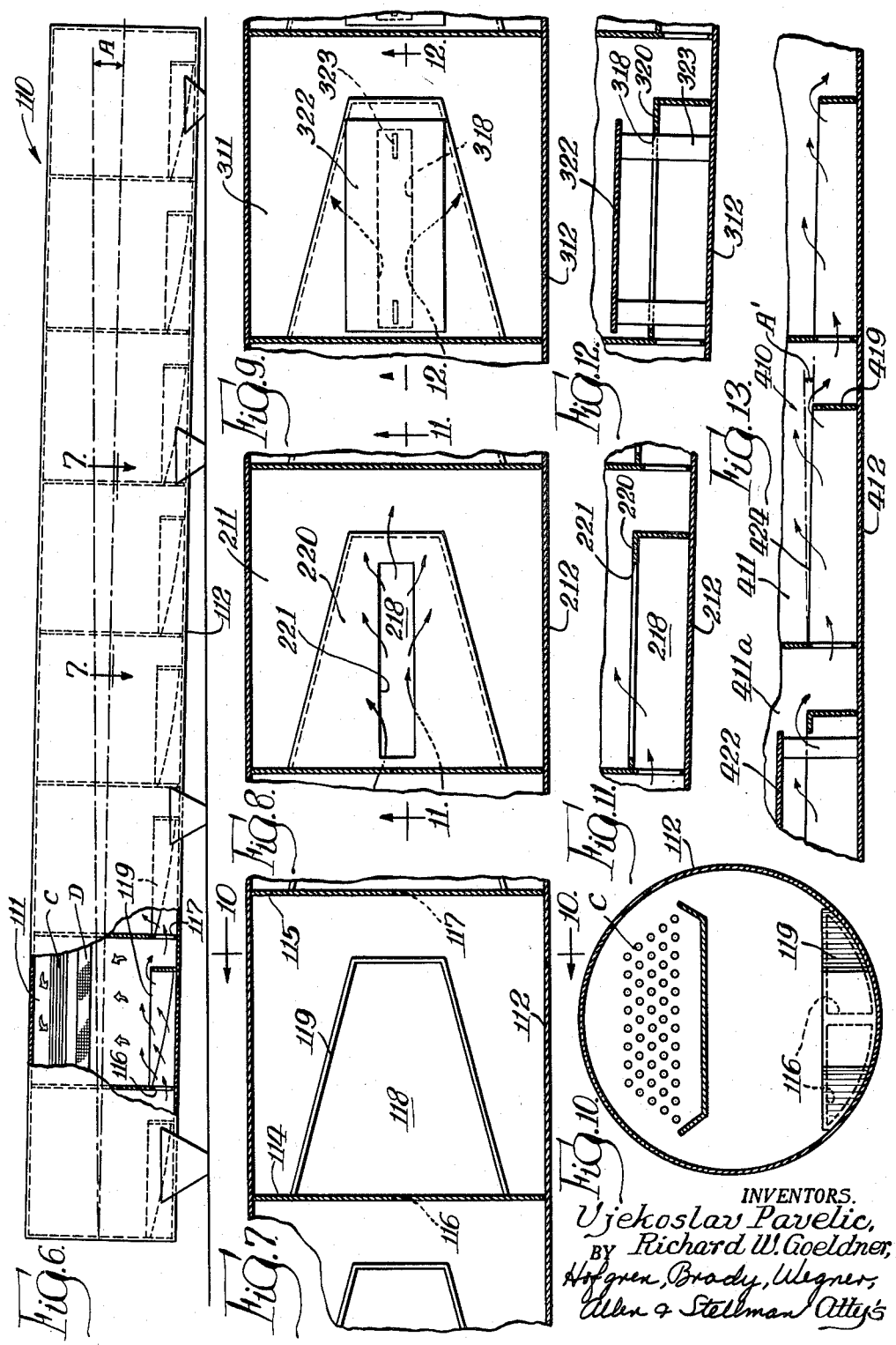

3,161,558
FLASH CHAMBER STRUCTURE
Vjekoslav Pavelic, West Allis, and Richard W. Goeldner, Brookfield, Wis., assignors to Aqua-Chem, Inc., a corporation of Wisconsin
Filed July 5, 1960, Ser. No. 40,615
3 Claims. (Cl. 159—2)

This invention relates to evaporators and in particular to flash chamber structures for use in multi-stage evaporators.

In multi-stage evaporators, a substantial number of flash chambers are provided in series relationship providing high evaporation efficiency. In such multi-stage evaporators, however, it is necessary to maintain an effective seal between stages to preclude the passage of substantial amounts of vapor therebetween. It is desirable to minimize the temperature drop between the successive stages while precluding substantial quantities of the liquid being entrained in the vapor produced in each stage.

The present invention is concerned with a new and improved multi-stage evaporator which solves each of the above indicated problems in a simple and economical manner. Thus, a principal object of the present invention is to provide a new and improved evaporator structure of the character described.

Another object of the invention is to provide a new and improved flash chamber structure for use in a multi-stage evaporator providing facilitated vaporization of the liquid in each stage thereby substantially improving the efficiency of the evaporator.

A further object of the invention is to provide such a flash chamber structure providing improved vaporization at low stage-to-stage pressure differentials.

Still another object of the invention is the provision of a flash chamber structure having an improved orifice plate means providing increased exposure of the liquid to the vaporizing space of the flash chamber permitting increased vaporization of the liquid therein.

Still another object of the invention is to provide such a multi-stage evaporator having a series of flash chamber structures provided with successively lower orifice plate means providing improved vaporization in the successive flash chambers.

Other features and advantages of the invention will be apparent from the following description, taken in connection with the accompanying drawing wherein:

FIG. 1 is a schematic plan view of a multi-stage evaporator provided with a flash chamber structure embodying the invention;

FIG. 2 is a fragmentary vertical section thereof taken substantially along the line 2—2 of FIG. 1;

FIG. 3 is an enlarged fragmentary plan view thereof;

FIG. 4 is a fragmentary transverse section thereof taken substantially along the line 4—4 of FIG. 3;

FIG. 5 is a fragmentary longitudinal section thereof taken substantially along the line 5—5 of FIG. 3;

FIG. 6 is a side elevation, with portions broken away, of a multi-stage evaporator provided with another form of flash chamber structure embodying the invention;

FIG. 7 is an enlarged fragmentary horizontal section taken substantially along the line 7—7 of FIG. 6;

FIG. 8 is a view generally similar to that of FIG. 7 but with an orifice plate provided in the flash chamber structure;

FIG. 9 is a view generally similar to that of FIG. 8 but with a baffle disposed superjacent the orifice plate;

FIG. 10 is a vertical section taken substantially along the line 10—10 of FIG. 7;

FIG. 11 is a fragmentary longitudinal vertical section taken substantially along the line 11—11 of FIG. 8;

FIG. 12 is a fragmentary longitudinal vertical section taken substantially along the line 12—12 of FIG. 9; and FIG. 13 is a fragmentary longitudinal vertical section of another form of multi-stage evaporator embodying the invention.

In the exemplary embodiment of the invention as disclosed in FIGS. 1–5 of the drawing, a multi-stage evaporator generally designated 10 is illustrated as comprising 22 series related flash chamber 11. Illustratively, evaporator 10 may be arranged to provide fresh water from sea water, a portion of the sea water brine being vaporized in each of the flash chambers comprising the successive stages of the evaporator.

Referring now more specifically to FIGS. 3, 4 and 5, the flash chamber structures 11 are defined by a pair of partition means extending transversely across the shell of the evaporator. More specifically, herein the evaporator is provided with an elongated cylindrical shell 12 divided longitudinally by a pair of vertical dividing walls 13. The partitioning means comprises an upstream, first wall 14 and a downstream, second wall 15 having flow passage openings 16 and 17 respectively in the lower portions thereof. The brine flowing into flash chamber 11 from the preceding stage passes through opening 16 into an inlet space 18 defined in the lower portion of chamber 11 by an upright wall 19 extending diagonally thereacross from first wall 14 to dividing wall 13 adjacent second wall 15. Thus, brine entering chamber 11 passes firstly into space 18 and thence over wall 19 to flow outwardly from the flash chamber 11 through the outlet passage 17 thereof. The flow of the brine upwardly from space 11 is controlled by means of an orifice plate 20 of generally triangular configuration and overlying the space 11 between walls 13, 14 and 19. At its wide, upstream, end, the orifice plate is provided with a plurality of apertures 21 through which the brine flows to pass in a relatively thin layer over the plate 20 to outlet 17. Thus, a substantial portion of the brine is exposed to the low pressure of the flash chamber effecting the flashing thereof. Further, as the vapor bubbles form in this relatively thin layer of brine on plate 20, they tend to mix the brine, further increasing the efficiency of vaporization and reducing the required pressure differential necessary to effect the desired vaporization. Illustratively, the pressure differential provided may be less than 2 inches.

Improved efficiency of vaporization is further provided in evaporator 10 by inclining the orifice plate 20 so that the brine flows downwardly thereover in passing to the outlet 17. The angle of inclination is preferably in the range of approximately 5° to 45° from the horizontal, and in the illustrated embodiment the orifice plate 20 is inclined downwardly from the dividing wall 13 in a plane substantially parallel to the axis of the shell 12.

In the last several stages of the evaporator 10, the elevation of the respective orifice plates may be progressively decreased for further improved efficiency of vaporization. Thus, referring now more specifically to FIG. 2, the last four stages of evaporator 10, namely stages 11a, 11b, 11c, and 11d are provided with orifice plates 20a, 20b, 20c, and 20d respectively which are arranged successively at lower elevations thereby assuring the desirable mixing in these final stages notwithstanding the relatively low pressure differentials thereof.

Thus, evaporator 10 provides an improved efficiency of vaporization in a simple and economical manner. An effective seal is maintained between the successive stages of the evaporator effectively precluding the passage of vapor therebetween while yet an effectively maximum vaporization is provided in each stage with effectively minimized temperature differentials therebetween and with effectively minimized pressure differentials therebetween. The mixing of the brine and the presentation of the substantially increased surface areas to the low pressures in the flashing chambers is obtained with effectively minimized entrainment of droplets in the vapor.

Referring now to FIGS. 6, 7 and 10, another form of evaporator 110 is shown to comprise a plurality of flash chamber structures 111. The cylindrical shell 112 of the evaporator is not provided with a central dividing wall and, thus, each stage extends completely across the interior of the shell. Each stage is defined by a first, upstream wall 114, and a second downstream wall 115 provided with flow passage openings 116 and 117 respectively. An upright wall 119 extends trapezoidally from first wall 114, as best seen in FIG. 7, to define a trapezoidal inlet space 118 with which the inlet passage 116 communicates.

As shown in FIG. 6, the shell 112 is axially inclined so that the stages of the evaporator are successively lower. Thus, the brine is delivered from stage to stage with an effectively minimized brine depth while yet substantially all portions of the brine are exposed to the low pressure within the flashing chamber in passing therethrough. Further, the brine is permitted to pass through the evaporator in a relatively short time thereby effectively minimizing scaling as in the associated condensers and heaters (not shown). As the shell is inclined, the condenser tubes C in the upper portion of the flash chambers may similarly be inclined permitting facilitated draining of the tubes and effectively minimizing corrosion thereof.

Referring now to FIGS. 8 and 11, a modified form of evaporator flash chamber structure 211 is shown to comprise a flash chamber structure generally similar to that of flash chamber structure 111 but having an orifice plate 220 overlying the inlet space 218 and provided with a rectangular central opening 221 through which the brine passes from the inlet space. The orifice plate 220 is parallel to the bottom of the inclined shell 212 and is similarly inclined. The area of the opening 221 may be varied to suit the operating conditions of the particular evaporator to effectively preclude passage of vapor from one stage to the next. Thus, flash chamber structure 211 functions substantially similarly to flash chamber structure 111, providing an improved evaporator operation.

Turning now to FIGS. 9 and 12, a flash chamber structure generally designated as 311, generally similar to flash chamber structure 211, includes a baffle plate 322 superjacent orifice plate opening 318 to prevent spray and splash from passing upwardly as into the demisters, such as demisters D of flash chamber structure 111. The baffle plate may be secured to the shell 312 by suitable legs 323 to extend generally parallel to the orifice plate 320. In all other respects, flash chamber structure 311 functions similarly to flash chamber structures 111 and 211.

Referring now more specifically to FIG. 13, still another form of evaporator 410 is shown to comprise a plurality of flash chamber structures 411 generally similar to flash chamber structures 111. However, in evaporator 410, the shell 412 extends axially horizontally and the upper edges 424 of the upright walls 419 are extended in a plane extending angularly downwardly in the direction of flow of the brine through the evaporator. As shown, the height of the upright wall may be decreased in the successive stages. In the earlier stages of the evaporator where the pressure differentials are relatively high, such as in flash chamber 411a, a baffle plate 422 may be provided to preclude spray and splash of the brine upwardly into the demisters (not shown).

In the inclined shell evaporator structure, the shell may be axially inclined at an angle A of approximately 5° as illustrated relative to shell 112. Where the upper edges of the upright walls are extended in planes similarly inclined to the horizontal, the angle A' thereof may similarly be approximately 5°, as illustrated relative to evaporator 410 in FIG. 13.

As illustrated, the orifice plates are preferably peripherally contiguous with the upper edges of the upright walls. The area of the orifice plates, corresponding to the area circumscribed by the upper edges of the upright walls, is preferably greater than one-half of the area of the portion of a horizontal plane at the level of the orifice plate within the flash chamber, thereby providing substantial presentation of the different portions of the brine to the low pressure in the chamber.

Except as otherwise noted, each of the different forms of the invention illustrated in the different figures comprises similar structure and functions similarly.

While we have shown certain embodiments of our invention, it is to be understood that it is capable of many modifications. Changes, therefore, in the construction and arrangement may be made without departing from the spirit and scope of the invention as defined in the appended claims.

We claim:

1. A flash chamber structure including means for removing the flashed vapor for use in a multistage evaporator comprising: a shell; first upright partition means extending across the shell and having an inlet opening adjacent the bottom thereof; second upright partition means extending across the shell at a distance forwardly of the first partition means and defining with the shell and first partition means a flash chamber therebetween in which a liquid flowing therethrough may be flashed, said second partition means having an outlet opening adjacent the bottom thereof; upright wall means cooperating with the shell and first partition means to define an upwardly opening inlet space in said flash chamber, said inlet opening communicating with said space; and a plate defining the upper boundary of said space, said plate having an opening therethrough for conducting substantially all liquid to be flashed in the flash chamber and said plate being inclined at an angle in the range of approximately 5° to 45° from the horizontal downwardly from said plate opening generally in the direction of flow of the liquid through said chamber for passing the liquid in a thin layer thereover defining an inclined liquid vaporization surface thereby to provide improved vaporization of the liquid.

2. Liquid agitating means for use in flashing liquid in a flash chamber of a multi-stage evaporator having means for removing the flashed vapor, said agitating means comprising an apertured plate in the flash chamber having an upper surface inclined downwardly in the direction of liquid flow through the flash chamber, said plate being apertured at the upstream end thereof and imperforate for a substantial distance back from the downstream end thereof; and means for conducting substantially all liquid to be flashed in the flash chamber upwardly through the apertured plate to pass downwardly on the upper surface of the plate in a thin layer.

3. A flash chamber structure including means for removing the flashed vapor for use in a multistage evaporator comprising: a shell; first upright partition means extending across the shell and having an inlet opening adjacent the bottom thereof; second upright partition means extending across the shell at a distance forwardly of the first partition means and defining with the shell and first partition means a flash chamber therebetween in which a liquid flowing therethrough may be flashed, said second partition means having an outlet opening adjacent the bottom thereof; means defining an upwardly opening inlet space in said flash chamber, said inlet opening communicating with said space; and a plate defining the upper boundary of said space, said plate having an opening therethrough for conducting substantially all liquid to be flashed in the flash chamber and said plate being inclined at an angle in the range of approximately 5° to 45° from the horizontal downwardly from said plate opening generally in the direction of flow of the liquid through said chamber for pasting the liquid in a thin layer thereover defining an inclined liquid vaporization surface thereby to provide improved vaporization of the liquid.

References Cited in the file of this patent

UNITED STATES PATENTS

| | | |
|---|---|---|
| 38,839 | Potter | June 9, 1863 |
| 40,562 | Hoyt | Oct. 10, 1863 |
| 56,585 | Maulsby | July 24, 1866 |
| 85,174 | Irving | Dec. 22, 1868 |
| 166,656 | Trumbo | Aug. 10, 1875 |
| 496,615 | Monsanto | May 2, 1883 |
| 630,174 | Brand | Aug. 1, 1899 |
| 1,190,769 | Jurist | July 11, 1916 |
| 1,501,513 | Boberg | July 15, 1924 |
| 1,524,837 | Meadows | Feb. 3, 1925 |
| 2,486,684 | Schlesman | Nov. 1, 1949 |
| 2,629,654 | Olney | Feb. 24, 1953 |
| 2,759,882 | Worthen et al. | Aug. 21, 1956 |
| 2,934,477 | Siegfried | Apr. 26, 1960 |
| 2,944,599 | Frankel | July 12, 1960 |

FOREIGN PATENTS

| | | |
|---|---|---|
| 831,478 | Great Britain | Mar. 30, 1960 |